J. A. VANSICKLER.
TRACTION VEHICLE.
APPLICATION FILED MAY 3, 1915.

1,160,794.

Patented Nov. 16, 1915.
3 SHEETS—SHEET 1.

WITNESSES
H. T. S. Henry
J. D. Hamilton

INVENTOR.
JAMES. A. VANSICKLER
by
Attys

J. A. VANSICKLER.
TRACTION VEHICLE.
APPLICATION FILED MAY 3, 1915.

1,160,794.

Patented Nov. 16, 1915.
3 SHEETS—SHEET 2.

WITNESSES
N. Y. S. Young.
J. D. Hamilton

INVENTOR
JAMES. A. VANSICKLER.
by

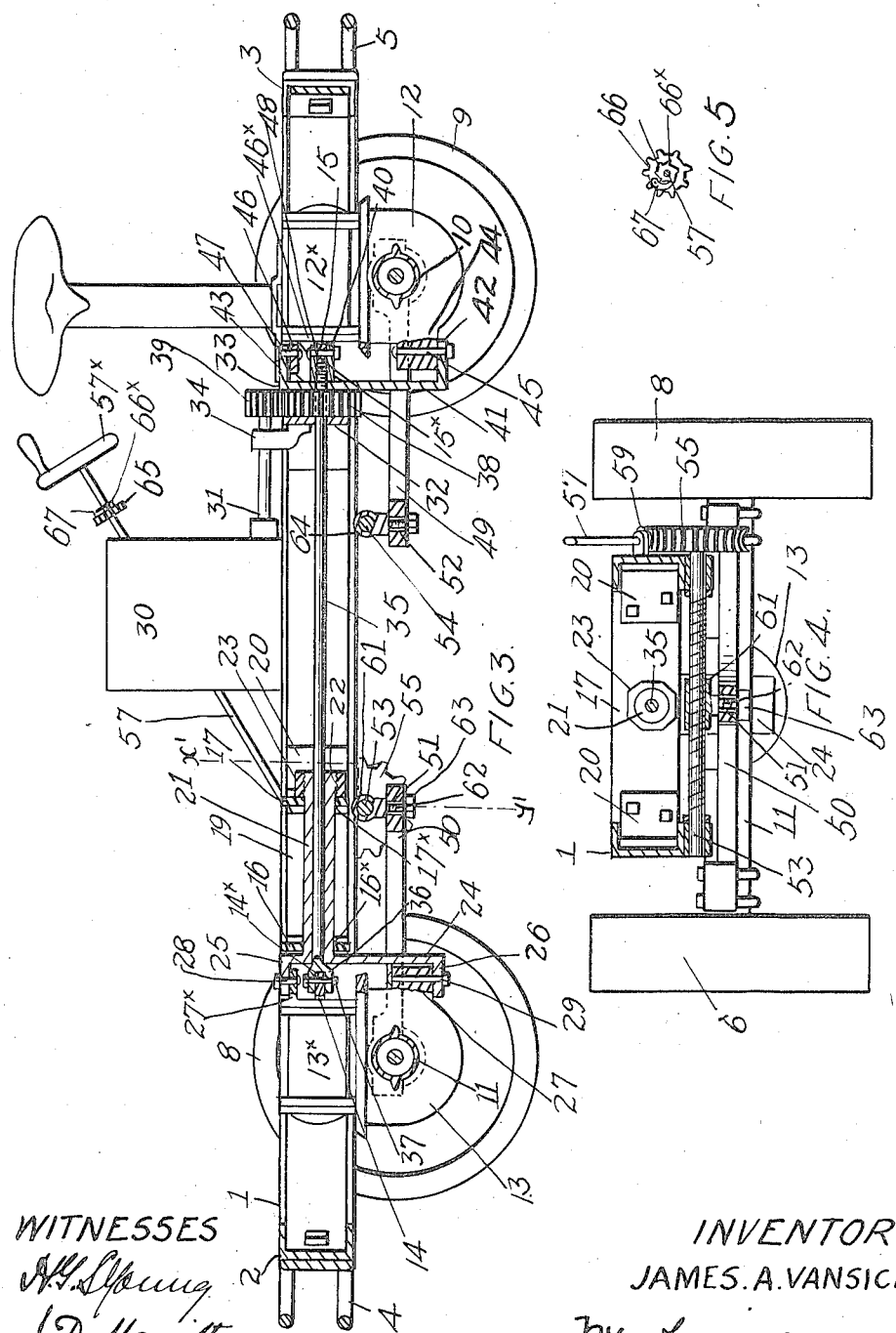

UNITED STATES PATENT OFFICE.

JAMES ANTHONY VANSICKLER, OF TORONTO, ONTARIO, CANADA.

TRACTION-VEHICLE.

1,160,794. Specification of Letters Patent. Patented Nov. 16, 1915.

Application filed May 3, 1915. Serial No. 25,554.

*To all whom it may concern:*

Be it known that I, JAMES ANTHONY VANSICKLER, of the city of Toronto, in the county of York, in the Province of Ontario, Canada, have invented certain new and useful Improvements in Traction-Vehicles, of which the following is the specification.

My invention relates to improvements in traction vehicles and the object of the invention is to devise a vehicle adapted for heavy traction which will have a maximum amount of flexibility to follow uneven ground surface and in which steering means are provided for adjusting both the front and rear wheels to carry the vehicle body in a diagonal direction when desired and it consists essentially of a vehicle frame, front and rear differentially driven wheels mounted on suitable axles having the differential gear cases located centrally of each axle, means for connecting the axles to the main frame to swing in a horizontal plane and so that the front axle will also swing in a vertical plane, yokes carried by the axles, threaded shafts carried by the frame of the machine, an internally threaded sleeve mounted on each threaded shaft, each sleeve being connected to one of the yokes, steering shafts mounted upon the main frame of the machine and a worm gear operated by each steering shaft for turning the threaded shafts as hereinafter more particularly explained by the following specification.

Figure 1:
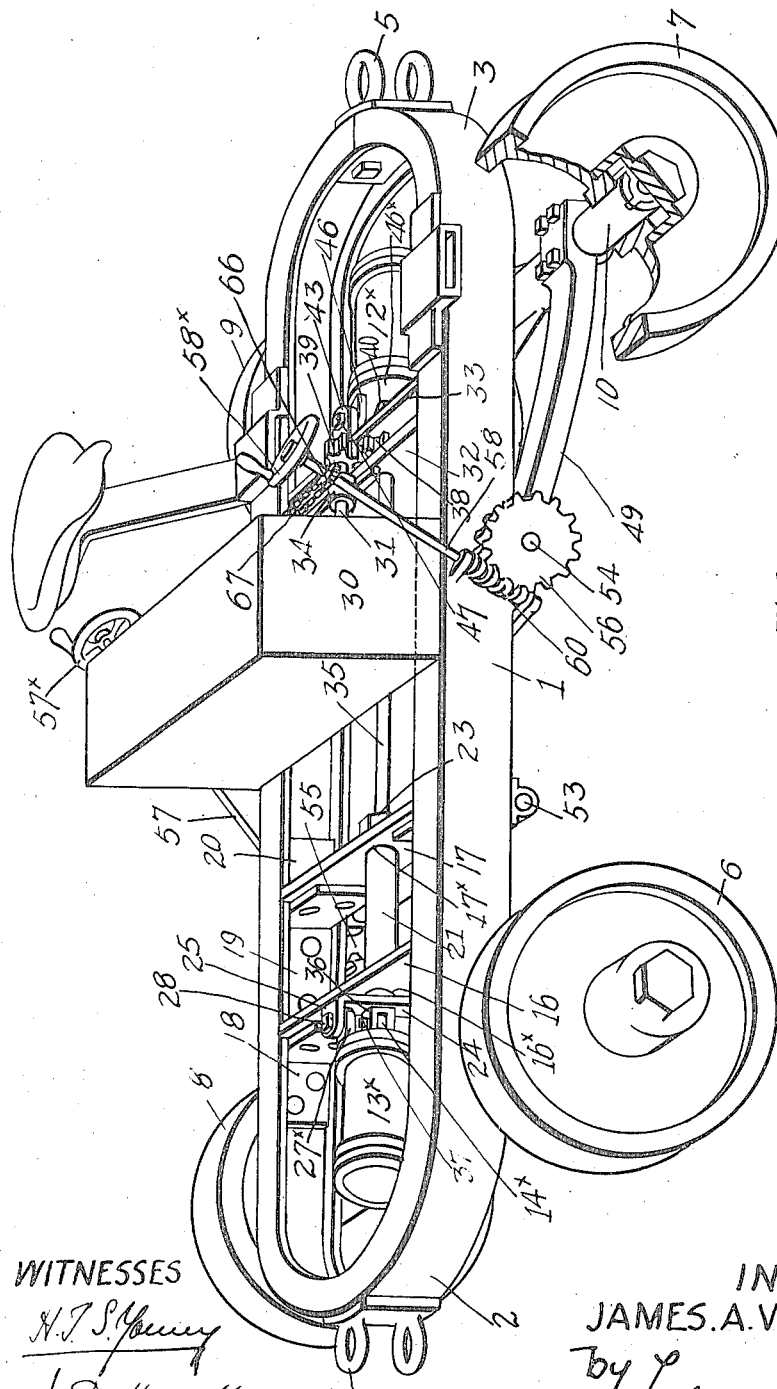
Figure 2:
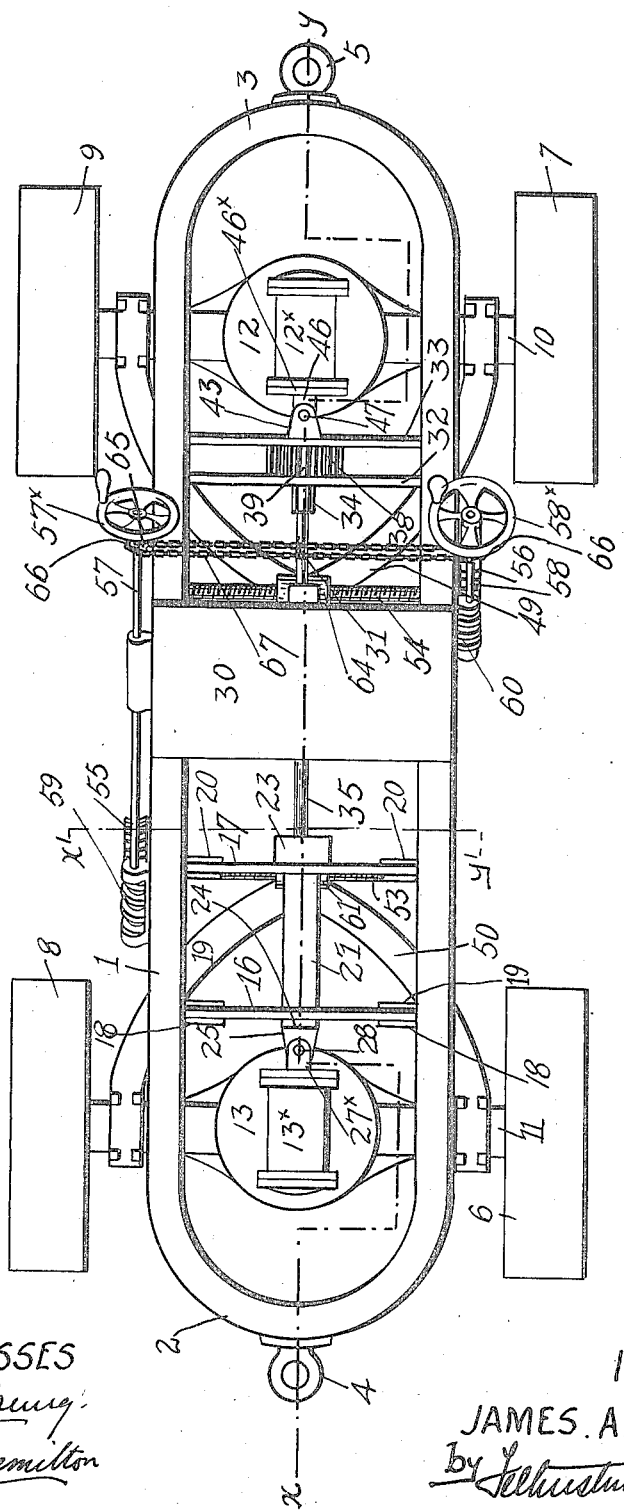

Figure 1, is a general perspective view of my device. Fig. 2, is a plan view. Fig. 3, is a longitudinal section on line $x$—$y$ Fig. 2. Fig. 4, is a cross section on line $x'$—$y'$ Figs. 2 and 3. Fig. 5, is a detail view of a portion of the steering mechanism.

In the drawings like letters of reference indicate corresponding parts in each figure.

1 indicates the main frame of the machine which is preferably provided with rounded ends 2 and 3 to which are secured loop members 4 and 5 for connecting the machine to the load.

6, 7, 8 and 9 indicate the carrying wheels of the machine.

10 and 11 indicate the differential gear shafts on which the wheels 6, 7, 8 and 9 are mounted in the usual manner, the central portion of the shafts being provided with differential gear cases 12 and 13 containing suitable differential gear.

I do not describe the differential gear, differential gear cases and shafts in detail and the means for connecting the carrier wheels 6, 7, 8 and 9 thereto as the construction thereof is of a type which is commonly in use and which has become standard further than to say that the differential gear used is of the type known as a worm driven differential gear.

The upper portions $12^x$ and $13^x$ of the differential gear cases 12 and 13 contain the driving worms 14 and 15 being the shafts of the said worms provided with flattened end portions $14^x$ and $15^x$.

16 and 17 indicate cross plates which extend across the main frame 1 and are secured to the side bar portions of the main frame by suitable brackets 18, 19 and 20. The plates 16 and 17 are provided centrally with bearing orifices $16^x$ and $17^x$.

21 indicates a bearing sleeve which passes through the bearing orifices $16^x$ and $17^x$, the inner end of the sleeve being provided with a threaded portion 22 on which is screwed a nut 23. The outer end of the sleeve 21 is provided with a vertical bar head 24 provided at its upper end with a horizontal lug portion 25 and at its lower end with a similar lug portion 26.

27 indicates the usual bearing boss which extends from the differential gear case 13.

$27^x$ indicates a lug which extends horizontally from the usual cap forming the end of the cylinder $13^x$.

28 indicates a bolt which extends through the lugs 25 and $27^x$ so as to pivotally connect them together.

29 indicates a bolt extending vertically through the boss 27 and lug 26.

30 indicates the motor which is supported on the main frame of the machine and located intermediate of its length.

31 indicates the motor shaft.

32 and 33 indicate cross plates located in proximity to the opposite end of the machine to the plates 16 and 17.

34 indicates a bearing bracket supported on the cross plate 32 and in which the motor shaft 31 is journaled.

35 indicates a counter shaft extending at one end through the sleeve 21 and journaled therein and at its opposite end through the plates 32 and 33 and journaled therein. One end of the counter shaft 35 is provided with a yoke 36 into which the flattened end 14˟ of the worm shaft 14 extends, being pivotally connected therein by the bolt 37. It will be noticed particularly on referring to Fig. 3 of the drawings that the bolts 28, 37 and 29 are in direct vertical alinement one with the other so as to allow of the differential gear case 13 and differential shaft 11 and wheels 6 and 8 connected to the differential case swinging freely in a horizontal plane. 38 indicates a gear secured to the shaft 35. The gear 38 is located between the cross plates 32 and 33. 39 indicates a gear pinion secured to the motor shaft 31, the pinion 39 being in mesh with the gear 38. 40 indicates a jaw member secured to the opposite end of the counter shaft 35.

41 indicates a depending portion extending from the plate 33 and located centrally thereof. The lower end of the depending portion 41 is provided with a horizontal lug 42.

43 indicates a lug extending from the central portion of the cross plate 33 in vertical alinement with the lug 42.

44 indicates a boss formed integral with the differential gear case 12, the boss 44 being similar to the boss 27 described in connection with the gear case 13.

45 indicates a vertical bolt extending through the boss 44 and lug 42.

46 indicates a lug extending from the cap 46˟ forming the head of the cylinder 12˟.

47 indicates a bolt extending through the lugs 43 and 46.

It will also be noticed on referring to Fig. 3 that the flattened portion 15˟ of the worm shaft 15 extends into the jaw member 40 and is pivotally secured therein by a vertical bolt 48, the bolts 47, 48 and 45 all being in direct vertical alinement one with the other so as to allow of the gear case 12 and differential shaft 10 and carrier wheels 7 and 9 carried thereby swinging in a horizontal plane. It will also be noticed that the wheels 8, differential shaft 11 and gear case 13 are free to swing in a vertical plane, these parts being turnably supported by the sleeve 21 and the cross plates 16 and 17. By this means the wheels 6 and 8 always have a continuous driving grip on the surface of the ground no matter how uneven the surface be.

49 and 50 indicate yokes secured to the axles 10 and 11 respectively extending inwardly from the axles 10 and 11 toward the center of the machine. The inner ends of the yokes 49 and 50 are provided with orifices 51 and 52.

53 and 54 indicate threaded shafts journaled in suitable bearings carried by the side bar portions of the main frame 1.

55 and 56 indicate worm gears secured to the shafts 53 and 54.

57 and 58 indicate steering shafts journaled in suitable bearings carried by the main frame of the machine and provided with hand wheels 57˟ and 58˟.

59 indicates a worm secured to the lower end of the steering shaft 57 in mesh with the worm gear 55.

60 indicates a worm secured to the steering shaft 58. The worm 60 meshes with the worm gear 56.

61 indicates an internally threaded sleeve mounted upon the threaded shaft 53. The sleeve 61 is provided with a depending stem 62 which extends freely through the orifice 51 being suitably connected to the yoke 50 by a nut 63. Although I have shown the sleeve 61 connected to the yoke in this manner it will, of course, be understood that various other connecting means might be employed such as a ball and socket joint. 64 indicates a similar sleeve mounted upon the threaded shaft 54 and similarly connected to the yoke 49.

65 indicates a sprocket wheel carried by the steering shaft 57. 66 indicates a similar sprocket wheel carried by the steering shaft 58 and 67 indicates an endless sprocket chain connecting the sprockets 65 and 66 together. The sprocket 65 is loosely mounted upon the steering shaft 57 and is connected thereto by a ratchet and dog 66˟ and 67 respectively, the ratchet 66˟ being secured to the steering shaft 57 and the dog 67 pivotally secured to the sprocket gear 65.

When it is desired to swing the wheels 6 and 8 in a horizontal plane independently of the wheels 7 and 9 the dog 67 is thrown out of engagement with the ratchet 66. The hand wheel 57˟ is then turned by the operator turning the shaft 57 and worm 59 and worm gear 55 and threaded shaft 53. By this means the sleeve 61 is carried crosswise of the machine so as to draw the yoke 50 in a corresponding direction and carry the axle 11 into an angular position to the main frame 1 of the machine.

If it is desired to carry the machine bodily in an angular direction I throw the dog 67 into engagement with the ratchet wheel 66. By this means when the hand wheel 57˟ is turned both the shafts 57 and 56 are turned in unison serving to draw the shafts 53 and 54 crosswise of the machine so as to simultaneously draw the axles 10 and 11 into an angular position. By this means the body of the machine remains undisturbed and yet can be carried in a direct angular direction to the normal direction of travel of the machine.

From the above description it will be seen that I have devised a machine particularly adaptable for heavy traction work, which will have a maximum gripping power on the surface of the ground no matter whether such surface is level or uneven and which will adapt itself to such uneven surface so as to always have a traction grip therewith and in which a simple form of steering gear is provided by which both the front and rear wheels may be controlled either independently or together as desired and which will be sufficiently powerful to easily control and adjust the wheels in any desired direction no matter how heavy the road is along which the machine is designed to pass. It will also be noticed that by the employment of a differential gear such as indicated that the wheels may be easily drawn by the steering mechanism to the desired position.

What I claim as my invention is—

1. In a traction vehicle, the combination with the main frame and forward traction wheels, a differential axle on which the traction wheels are mounted and differential gear mechanism provided with the usual operating shaft and a suitable casing provided with upper and lower bearing portions extending longitudinally of the main frame, of cross plates extending across the main frame, a bearing sleeve extending longitudinally of the main frame and journaled within the cross plates, a normally vertical bar head carried by the sleeve and having horizontal bearing lugs extending from its upper and lower end, a driving shaft journaled in the sleeve, a vertical pivotal connection between the driving shaft and the operating shaft of the differential gear, a pivotal connection between the upper lug of the bar head and the upper bearing portion of the differential gear case located in vertical alinement with the pivotal connection between the driving shaft and shaft of the differential gear mechanism, and a pivotal connection between the lower lug of the bar head and the lower bearing portion of the differential gear case also in vertical alinement with the pivotal connection between the driving shaft and the shaft of the differential gear, and manual means for swinging the differential gear through a horizontal plane around the upper and lower pivotal connections.

2. In a traction vehicle, the combination with the main frame and forward traction wheels, a differential axle on which the traction wheels are mounted and differential gear mechanism provided with the usual operating shaft and a suitable casing, of cross plates carried by the main frame, a sleeve bearing journaled in the cross plates, an upper and lower pivotal connection between the sleeve bearing and the differential gear case, a driving shaft extending through the sleeve, a pivotal connection between the driving shaft and the shaft of the differential gear located in vertical alinement with the aforesaid pivotal connections, a yoke carried by the axle, a steering shaft carried by the main frame and provided with an operating handle at its upper end, and means operated by the rotation of the steering shaft for drawing the inwardly extending end of the yoke crosswise of the main frame.

3. In a traction vehicle, the combination with the main frame and forward traction wheels, a differential axle on which the traction wheels are mounted and differential gear mechanism provided with the usual operating shaft and a suitable casing, of cross plates carried by the main frame, a sleeve bearing journaled in the cross plates, an upper and lower pivotal connection between the sleeve bearing and the differential gear case, a driving shaft extending through the sleeve, a pivotal connection between the driving shaft and the shaft of the differential gear located in vertical alinement with the aforesaid pivotal connections, a yoke carried by the axle, a steering shaft carried by the main frame and provided with an operating handle at its upper end, a threaded shaft carried by the main frame, a sleeve thereon, a flexible connection between the sleeve and the inner end of the yoke, and a gear connection between the steering shaft and the threaded shaft.

4. In a traction vehicle, the combination with the main frame and forward traction wheels, a differential axle on which the traction wheels are mounted and differential gear mechanism provided with the usual operating shaft and a suitable casing, of cross plates carried by the main frame, a sleeve bearing journaled in the cross plates, an upper and lower pivotal connection between the sleeve bearing and the differential gear case, a driving shaft extending through the sleeve, a pivotal connection between the driving shaft and the shaft of the differential gear located in vertical alinement with the aforesaid pivotal connections, a yoke carried by the axle, a steering shaft carried by the main frame and provided with an operating handle at its upper end, a threaded shaft carried by the main frame, a sleeve thereon, a flexible connection between the sleeve and the inner end of the yoke, and a worm gear connection between the steering shaft and the threaded shaft.

5. In a traction vehicle, the combination with the main frame and forward traction wheels, a differential axle on which the traction wheels are mounted and differential gear mechanism provided with the usual operating shaft and a suitable casing, of a driving shaft extending longitudinally of the main frame, a suitable bearing for the driving shaft carried by the main frame, an upper and lower pivoted connection between the said bearing and the casing of the differential gear, and a pivotal connection between the driving shaft and the shaft of the differential gear located in vertical alinement with the aforesaid pivotal connection, and means for swinging the differential axle in a horizontal plane around such alined pivots.

JAMES ANTHONY VANSICKLER.

Witnesses:
E. PENNOCK,
M. EGAN.